3,119,814
PREPARATION OF CAPROLACTAM
Johan A. Bigot, Beek, and Theo A. J. Meyerink and
Leonardus J. Revallier, Geleen, Netherlands, assignors
to Stamicarbon N.V., Heerlen, Netherlands
No Drawing. Filed Apr. 12, 1962, Ser. No. 186,842
Claims priority, application Netherlands Apr. 18, 1961
6 Claims. (Cl. 260—239.3)

The present invention relates to the preparation of caprolactam, which is an important starting material for the preparation of polyamides.

The principal object of the present invention is to provide a novel and advantageous process for preparing caprolactam. Other objects will also be hereinafter apparent.

According to the invention, caprolactam is prepared by reaction of cyclohexane carboxylic acid and/or derivatives thereof, with a nitrylsulphuric acid compound in the presence of sulphuric acid.

Derivatives of cyclohexane carboxylic acid which can be used as a starting material in the present invention are, for example, salts, esters, and the anhydride of cyclohexane carboxylic acid. Cyclohexane carbohalogenides, cyclohexane carbonamide and cyclohexane carbonitrile may also be used.

Examples of nitryl-sulphuric acid compounds which may be used in the process of the invention are nitryl-hydrosulfate ($NO_2.HSO_4$) and nitryl-hydropyrosulfate ($NO_2.HS_2O_7$). These compounds may be prepared in a simple way by reaction of nitric acid and sulphur trioxide.

As indicated above, the reaction with the nitrylsulphuric acid compound should be carried out in the presence of sulphuric acid. Sulphur trioxide, for example, in the form of oleum, may also be added. Usually the sulphuric acid should be used in an amount ranging from about 25 to 500% by weight, based on the weight of the nitryl-sulphuric acid compound.

The reaction wherein the desired caprolactam is formed, involves both oxidation and nitration. As a result, the cyclohexane carboxylic acid starting material also yields nitrobenzene as a by-product.

The process of the invention can be carried out at various temperatures. If desired, the temperature can be kept below room temperature, for example, in the range of 10° to −20° C., by cooling. However, the reaction is usually carried out at higher temperatures, for example, 50–150° C. If a solvent, for instance, a saturated hydrocarbon, such as hexane, heptane, cyclopentane, or cyclohexane is used, the reaction can be carried out by operating at the boiling temperature of the reaction mixture. Substances which can affect the oxidation, such as piperidine, may also then be added to the reaction mixture.

The results of the present process are not significantly affected by the pressure utilized. Atmospheric pressure is preferred although subatmospheric or superatmospheric pressures may also be used if desired.

The nitryl-sulphuric acid compound and cyclohexane carboxylic acid and/or its derivatives may be used in varying amounts in practicing the present invention. As a rule, however, approximately equimolecular amounts are used. An excess of the carboxylic acid component causes an incomplete conversion thereof. Where such an excess is used, the non-converted cyclohexane carboxylic acid can be recovered during the processing of the reaction products.

The invention is illustrated, but not limited, by the following examples:

*Example 1*

In a reaction vessel with a capacity of 2 litres, provided with a stirring device and a reflux cooler, 385 g. of cyclohexane carboxylic acid were dissolved in 500 cm.$^3$ of cyclohexane. The solution was kept at the boiling temperature and a mixture of 450 g. of nitryl-hydropyrosulfate, 700 g. of 100% sulphuric acid and 45 g. of sulphur trioxide was added. Thereafter, the reaction mixture was boiled for another hour while being refluxed.

The reaction mixture was then poured onto 1 kg. of ice and cooled to room temperature. The resulting two layers were separated. The acid aqueous liquid was extracted with benzene and the benzene solution was added to the isolated organic layer after which 209 g. of non-converted cyclohexane carboxylic acid, 15 g. of nitrobenzene and 30 g. of non-identified residue were recovered from the organic mixture by distillation.

Upon neutralization, the aqueous liquid was extracted with chloroform, and 110 g. of caprolactam, corresponding to a yield of 71% calculated on the amount of converted carboxylic acid, were obtained from the extract.

*Example 2*

Using the apparatus of Example 1, 280 g. of cyclohexane carboxylic acid were dissolved in 300 cm.$^3$ of n-hexane. The solution was kept at the boiling temperature and a mixture of 223 g. of nitryl-hydropyrosulfate, 250 g. of 100% sulphuric acid and 15 g. of sulphur trioxide and a mixture of 280 g. of piperidine and 200 cm.$^3$ of n-hexane were added simultaneously. Thereafter, the reaction mixture was boiled while being refluxed for one hour.

The reaction mixture was then poured onto 1 kg. of crushed ice and cooled to room temperature. Processing was then completed in the manner described in Example 1.

140 g. of non-converted cyclohexane carboxylic acid, 24 g. of nitrobenzene, 15 g. of meta-dinitrobenzene and 25 g. of residue were obtained along with 91 g. of caprolactam corresponding to a yield of 73% based on the amount of converted carboxylic acid.

It will be recognized that various modifications may be made in the invention as described herein without deviating from the scope thereof as defined in the following claims wherein we claim:

1. A process for preparing caprolactam which comprises reacting a member of the group consisting of cyclohexane carboxylic acid and derivatives thereof, with a nitryl-sulphuric acid compound in the presence of sulphuric acid, said nitryl-sulfuric acid compound being selected from the group consisting of nitryl-hydropyrosulphate and nitryl-hydrosulphate.

2. The process of claim 1 wherein the nitryl-sulphuric acid compound is nitryl-hydropyrosulphate.

3. The process of claim 1 wherein the nitryl-sulphuric acid compound is nitryl-hydrosulphate.

4. The process of claim 1 wherein said reaction is carried out in the presence of a saturated hydrocarbon solvent and at the boiling point of the reaction mixture.

5. The process of claim 1 wherein said member and nitryl-sulphuric acid compound are used in equimolecular amounts.

6. The process of claim 1 wherein the reaction is carried out in the presence of sulphur trioxide.

References Cited in the file of this patent

UNITED STATES PATENTS 3,022,291  Muench et al. _____ Feb. 20, 1962

FOREIGN PATENTS 1,238,981  France _____ July 11, 1960
52,901/59  Australian Abst. _____ Mar. 24, 1960
52,908/59  Australian Abst. _____ Mar. 24, 1960
58,823/60  Australian Abst. _____ Sept. 29, 1960

OTHER REFERENCES

Moeller: "Inorganic Chemistry," pp. 595–98, 609–612 (Wiley) 1952.